United States Patent Office 3,415,859
Patented Dec. 10, 1968

3,415,859
UNSYMMETRICAL FERROCENE α-DIOLS
John T. Suh, Mequon, Wis., assignor to Colgate-Palmolive Company, New York, N.Y., a corporation of Delaware
No Drawing. Filed Oct. 7, 1965, Ser. No. 493,871
6 Claims. (Cl. 260—439)

ABSTRACT OF THE DISCLOSURE

The compounds are unsymmetrical ferrocene diols useful as intermediates in the preparation of the corresponding unsymmetrical ferrocene cyclic ethers which are hematinic agents. Among the compounds disclosed are 1-(α-hydroxyethyl)-1'-(α'-hydroxypropyl)ferrocene and 1-(α-hydroxyethyl)-1'-(α'-hydroxybenzyl)ferrocene.

This application relates to ferrocene derivatives. More particularly, it relates to novel unsymmetrical disubstituted ferrocene cyclic ethers and novel tri- and tetrasubstituted ferrocene cyclic ethers, as well as intermediates and processes useful for producing such compounds. Ferrocene is the commonly accepted name for dicyclopentadienyliron or biscyclopentadienyliron.

The unsymmetrical ferrocene cyclic ethers may be represented by the following formulae:

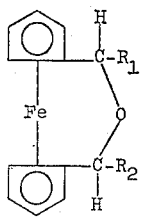

Formula I in which $R_1$ and $R_2$ are different members selected from hydrogen, lower alkyl such as methyl, ethyl, isopropyl, butyl, pentyl and hexyl, an aryl such as phenyl, or nuclear-substituted phenyl such as a halogen-substituted phenyl, aralkyl such as benzyl, phenethyl, phenylisopropyl and diphenylmethyl, cycloalkyl, particularly a cycloalkyl having from 3 to 7 carbon atoms such as cyclopropyl, cyclopentyl and cyclohexyl, and cycloalkyl-lower alkyl such as cyclohexyl-methyl or cyclopentyl-ethyl.

The tri- and tetrasubstituted cyclic ethers may be represented by the following formula:

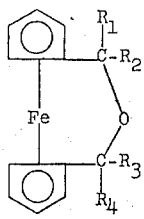

Formula II in which $R_1$, $R_2$, $R_3$ and $R_4$ are the same or different members selected from hydrogen, lower alkyl such as methyl, ethyl, isopropyl, butyl, pentyl or hexyl, an aryl such as phenyl, or nuclear-substituted phenyl such as a halogen-substituted phenyl, aralkyl such as benzyl, phenethyl, phenylisopropyl and diphenylmethyl, cycloalkyl, particularly a cycloalkyl having from 3 to 7 carbon atoms such as cyclopropyl, cyclopentyl and cyclohexyl, and cycloalkyl-lower alkyl such as cyclohexyl-methyl or cyclopentyl-ethyl, and no more than one of $R_1$, $R_2$, $R_3$ and $R_4$ is hydrogen.

The novel compounds of the present invention may be prepared by treating a corresponding ferrocene diol with a liquid lower aliphatic acid and water. The process proceeds relatively quickly even at room temperature and the cyclic ethers obtained are of high purity and usually do not require additional purification.

In the preferred practice of the process, an excess of glacial acetic acid is added portionwise to dissolve the diol employed as a starting material. The resulting solution is stirred at room temperature and water added in small portions until the cyclic ether precipitates. The mixture is then cooled and the cyclic ether recovered by filtration or other conventional means.

The preferred method of preparing the cyclic ethers from diols that are not readily acid soluble comprises initially dissolving the diol to be cyclized in a solvent amount of an organic solvent such as benzene, and then adding the acid and water as previously described.

In addition to acetic acid, other liquid lower aliphatic acids such as formic and propionic acids can be used. The concentration of the acid must be such that the diol will dissolve therein, usually about 70% to 100%. The amount of acid required is an amount that will completely dissolve the diol employed as a starting material. However, a slight excess of acid is generally preferred to insure complete solution of the diol.

The preferred method, which comprises dissolving the diol in acid and then adding water in small portions until the cyclic ether precipitates, both minimizes the risk of precipitating the unreacted diol and, in addition, facilitates the separation of the ether from the reaction mixture.

The reaction generally proceeds rather quickly even at room temperature and some of the reactions are substantially complete in as little as 5 to 15 minutes. However, others may take much longer. If desired, the reactions may be conducted at elevated temperatures and under a nitrogen atmosphere.

Representative of the cyclic ethers which may be prepared by the described processes are the following:

1-ethyl-1'-hexyl-α,α'-epoxyferrocene,
1-methyl-1'-benzyl-α,α'-epoxyferrocene,
1-ethyl-1'-methyl-α,α'-epoxyferrocene,
1-ethyl-1'-propyl-α,α'-epoxyferrocene,
1-ethyl-1'-benzyl-α,α'-epoxyferrocene,
1,1'-[(α,α'-tetramethyl)dimethyleneepoxy]ferrocene,
1,1'-[α,α'-dimethyl-α,α'-diphenyl)dimethyleneoxy]-ferrocene, and
1-(α-cyclohexylethyl)-1'-(α-phenylpropyl)-2,2'-epoxyferrocene.

The diols intended for use as starting materials in the preparation of the cyclic ethers of Formula I may be prepared by treating the corresponding diacyl compounds with a chemical agent, such as lithium aluminum hydride or sodium borohydride, or with hydrogen under superatmospheric pressure at temperatures below 75° C. in the presence of a hydrogenation catalyst such as a platinum or palladium catalyst. (U.S. Patent No. 2,810,737.)

The novel diols prepared by the above process may be represented by the following formula:

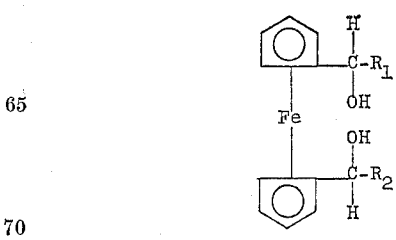

in which $R_1$ and $R_2$ are as defined in Formula I.

Illustrative of the novel diols which may be prepared by the above process are the following:

1-(α-hydroxyethyl)-1'-(α'-hydroxyhexyl)ferrocene,
1-(α-hydroxymethyl)-1'-(α'-hydroxybenzyl)ferrocene,
1-(α-hydroxyethyl)-1'-(α'-hydroxymethyl)ferrocene, and
1-(α-hydroxyethyl)-1'-(α'-hydroxybenzyl)ferrocene.

The following is a brief description of the preparation of the novel diacyl derivatives which are used to prepare the above described diols.

The diacyl derivatives which are used to prepare the corresponding unsymmetrical diols, the compounds of Formula I, may be prepared by first producing the monoacyl derivative by treating ferrocene with an aliphatic acylating agent, such as a carboxylic acid anhydride, at a temperature between 20° and 120° C., in the presence of a Friedel Crafts catalyst such as $BF_3$-etherate, hydrogen fluoride, a metal halide such as aluminum chloride or a polyphosphoric acid. (U.S. Patent No. 2,988,562.)

The monoacyl derivative, thus obtained, is then treated with an acylating agent such as an acid chloride, in the presence of a Friedel Crafts condensing agent, as described above. The resulting unsymmetrical diacyl compounds may be treated as previously described to form the diols.

The novel diacyl compounds prepared by the above process may be represented by the following formula:

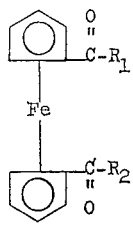

in which $R_1$ and $R_2$ are as defined in Formula I.

Illustrative of the novel diacyl compounds which may be prepared by the above process are the following:

1-acetyl-1'-propylferrocene,
1-acetyl-1'-benzoylferrocene,
1-acetyl-1'-hexanoylferrocene,
1-formyl-1'-benzoylferrocene, and
1-acetyl-1'-formylferrocene.

The unsymmetrical diols may then be treated with a lower aliphatic acid and water, as previously described, to form the cyclic ethers.

The diols which are used to prepare the compounds of Formula II in which no more than one of $R_1$, $R_2$, $R_3$ and $R_4$ are hydrogen, may be prepared by treating a diacyl such as 1,1'-diacetylferrocene with an aryl or alkyl lithium compound, or an alkyl magnesium halide to form the tri- or tetrasubstituted diol.

The novel diols prepared by the above process may be represented by the following formula:

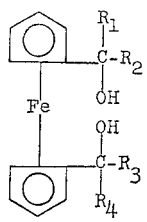

in which $R_1$, $R_2$, $R_3$ and $R_4$ are as defined in Formula II.

Illustrative of the novel diols of the above formula are the following:

1,1'-di(α-hydroxy-α-methylbenzyl)ferrocene, and
bis(1-hydroxyisopropyl)ferrocene.

The diols obtained may then be treated as previously described to form the cyclic ethers.

Ferrocene, which is used to prepare the acyl derivatives, is commercially available from several sources. However, if desired, it may be prepared in the laboratory by a variety of methods. One such method involves the reaction between cyclopentadiene and iron pentacarbonyl in the manner described in U.S. Patent No. 2,791,597. Another such method involves the Grignard reaction between a cyclopetadienyl magnesium halide and an anhydrous halide of iron dissolved in ether, as described in U.S. Patent No. 2,680,756. Still another method comprises treating an anhydrous halide of iron with cyclopentadienyl sodium in the manner described in U.S. Patent No. 3,092,647.

The unsymmetrical ferrocene cyclic ethers are excellent hematinic agents, useful in the treatment of iron deficiency anemia in animals such as piglets, and humans. The compounds of the present invention are more readily absorbed when administered orally than previously available hematinics and, in addition, are less toxic than ferrocene itself.

When used as hematinic agents, the ferrocene-cyclic ethers may be combined with pharmaceutical diluents and formed into dosage forms suitable for oral or parenteral administration such as tablets, capsules, syrups, elixirs, solutions or the like.

Pharmaceutical carriers which are either liquid or solid may be employed. The preferred liquid carrier is water. However, suitable organic solvents such as propylene glycol may also be employed. Flavoring materials may be included if desired.

Solid pharmaceutical carriers such as starch, sugar and talc can be utilized to form powders. These powders can be used as such or can be tableted or used to fill gelatin capsules. Suitable lubricants such as magnesium stearate, binders such as gelatin, and distintegrating agents such as sodium carbonate in combination with citric acid may be employed in the formation of the tablets.

Unit dosage forms such as tablets and capsules may contain any suitable predetermined amount of one or more of the active ingredients as a non-toxic acid addition salt, and may be administered one or more at a time at regular intervals. Such unit dosage forms, however, should advisably contain about 5 to 500 mg. of the active ingredients.

A typical tablet may have the following composition:

| | Mg. |
|---|---|
| Ferrocene cyclic ether | 250 |
| Polyvinylpyrrolidone (Pharmaceutical grade) | 15 |
| Corn starch | 50 |
| Magnesium stearate | 3 |

The tablets are formed on a ⅜ inch deep cup punch and the tablets may be coated, if desired.

A typical soft gelatin capsule, size 0, may have the following composition:

| | | |
|---|---|---|
| Ferrocene cyclic ether | mg | 250 |
| Polyehylene glycol 400 | cc. (q.s.ad.) | 0.5 |

A typical oil solution may contain the following ingredients in each teaspoonful:

| | | |
|---|---|---|
| Ferrocene cyclic ether | | 250 |
| Preservatives and flavor, q.s. | | |
| Peanut oil | ml. (q.s.ad.) | 5 |

A typical aqueous suspension intended for oral administration may contain the following ingredients in each teaspoonful:

| | | |
|---|---|---|
| Ferrocene cyclic ether | mg | 250 |
| Sorbitol | cc | 1.250 |
| Sodium carboxymethyl cellulose | mg | 50 |
| Cellulose (microcrystalline) | mg | 500 |
| Preservatives and flavor, q.s. | | |
| Water | cc. (q.s.ad.) | 5 |

The exact quantity of the composition to be administered, of course, will depend upon many factors including the elemental iron content of the compound and the nature and extent of the iron deficiency of the patient. However, generally speaking, the amount administered in a single day will be equivalent to about 5 mg. to about 500 mg. of elemental iron.

The following examples illustrate the preparation of the intermediates and the cyclic ethers.

Example 1.—1-acetylferrocene

To 200 ml. of methylene chloride is added 150 g. (0.5 mole) of 47% boron trifluoride ether complex with cooling. To the solution is added in portions with cooling a mixture of 102 g. (1.0 mole) of acetic anhydride and 93 g. (0.5 mole) of ferrocene in 800 ml. of methylene chloride. The addition requires about 4 hours. The reaction mixture is stirred at 0°–15° C. for 15 hours.

To the reaction mixture is added in portions a solution of 200 g. of sodium acetate in 500 ml. of water. The aqueous layer is separated and washed with methylene chloride (200 ml.). The combined methylene chloride solution is washed with water and saturated sodium bicarbonate solution, and is dried over anhydrous sodium sulfate.

Methylene chloride is distilled under diminished pressure and the solid product is recrystallized from 2 liters of n-hexane to give 77 g. of monoacetylferrocene, M.P. 82–85°, in the form of orange-red needles.

Example 2.—1-acetyl-1'-propionylferrocene

To a dispersion of 20.3 g. (0.15 mole) of aluminum chloride in 200 ml. of dichloromethane is added dropwise a solution of 13.9 g. (0.06 mole) 1-acetylferrocene in 125 ml. of dichloromethane. The mixture is heated to reflux and 6.1 g. (0.07 mole) of propionyl chloride in 100 ml. dichloromethane is added in 25 minutes after which it is refluxed for an additional 35 minutes. The mixture is poured into 1 liter of ice water and extracted with chloroform. The extract is washed with 10% sodium hydroxide solution, brine, and concentrated to yield a dark oil which is chromatographed through activated alumina using ether as an eluent to yield a semi-solid which is crystallized. It is recrystallized from ether and cooled in a Dry Ice/acetone bath to yield an orange solid, 1-acetyl-1'-propionylferrocene, M.P. 58.5–59°.

Analysis.—Calcd. for $C_{15}H_{16}FeO_2$: C, 63.41; H, 5.68. Found: C, 63.42; H, 5.53.

Example 3.—1-(α-hydroxyethyl)-1'-(α'-hydroxypropyl) ferrocene

A mixture of 13.8 g. (0.049 mole) of 1-acetyl-1'-propionylferrocene and 4.0 g. (0.16 mole) of sodium borohydride in 225 ml. of isopropanol is refluxed for 4.5 hours. The mixture is concentrated and 50 ml. of brine and 150 ml. of ether are added. The mixture is then stirred for 10 minutes. The ether solution is separated, washed with brine, dried, and concentrated. The residue is taken up in 150 ml. of benzene, treated with activated charcoal, and concentrated to yield a yellow oil which is dried at 70°/4.0 mm. to yield 1-(α-hydroxyethyl)-1'-(α'-hydroxypropyl)ferrocene, B.P. 140°/0.05 mm.

Analysis.—Calcd. for $C_{15}H_{20}FeO_2$: C, 62.51; H, 7.00; Fe, 19.39. Found: C, 62.69; H, 7.25; Fe, 19.35.

Example 4.—1-ethyl-1'-propyl-α,α'-epoxyferrocene

Three grams (0.0104 mole) of 1-(α-hydroxyethyl)-1'-(α'-hydroxypropyl)ferrocene is dissolved in 100 ml. of glacial acetic acid and the solution allowed to stand at room temperature with stirring for 40 minutes.

To the reaction mixture is added dropwise 250 ml. of water and the reaction mixture is stirred at room tempreature for 1 hour. The semi-solid product is separated by decantation and recrystallized twice by dissolving the product in 50 ml. of methanol and adding the filtrate (methanol) to 200 ml. of water. After drying, 1-ethyl-1'-propyl-α,α'-epoxyferrocene, M.P. 66–70°, is obtained in the form of yellow plates.

Analysis.—Calcd. for $C_{15}H_{18}FeO$: C, 66.69; H, 6.71. Found: C, 66.68; H, 6.53.

Example 5.—1-acetyl-1'-benzoylferrocene

To a dispersion of 21.6 g. (0.162 mole) of aluminum chloride in 200 ml. of dichloromethane is added 9.8 g. (0.07 mole) of benzoyl chloride, dissolved in 30 ml. dichloromethane in 15 minutes. A solution of 14.8 g. (0.065 mole) of 1-acetylferrocene in 150 ml. dichloromethane is then added in 20 minutes after which the mixture is stirred for 2 hours at room temperature and then poured into 1 liter of ice water. The organic layer is separated, and the aqueous layer extracted twice with chloroform. The organic solutions are combined and washed twice with 200 ml. portions of 10% sodium hydroxide, once with brine, dried, and concentrated to yield a red oil. It is chromatographed through the activated alumina. n-Hexane (2.5 liters) is passed through the column to yield a yellow solid which is recrystallized from n-hexane to yield 2.3 g. of 1-acetylferrocene. A 50% solution of n-hexane and ether (800 ml.) is then passed through the column to yield a red oil which is crystallized from 100 ml. of ether, cooled in a salted ice bath to give 1-acetyl-1'-benzoylferrocene in the form of a bright red powder, M.P. 69–70°.

Analysis.—Calcd. for $C_{19}H_{16}FeO$: C, 68.71; H, 4.85. Found: C, 68.85; H, 5.01.

Example 6.—1-(α-hydroxyethyl)-1'-(α'-hydroxybenzyl)ferrocene

A mixture of 4.4 g. (0.013 mole) of 1-acetyl-1'-benzoylferrocene and 1.06 g. (0.028 mole) of sodium borohydride in 65 ml. of isopropanol is gently refluxed for 4.5 hours after which it is concentrated in vacuo to yield a yellow residue which is stirred in a mixture of 100 ml. of ether and 50 ml. of brine for 0.5 hours. The aqueous layer is separated and extracted twice with ether. The organic solutions are combined, washed with brine, dried, and concentrated to yield a solid which is recrystallized from ethanol to yield 1-(α-hydroxyethyl)-1'-(α'-hydroxybenzyl)ferrocene in the form of a yellow crystalline powder, M.P. 122–123.5°.

Analysis.—Calcd. for $C_{19}H_{20}FeO_2$: C, 67.87; H, 6.00. Found: C, 67.89; H, 6.20.

Example 7.—1-ethyl-1'-benzyl-α,α'-epoxyferrocene 1-(α-hydroxyethyl)-1'-(α'-hydroxybenzyl)ferrocene (1.5 g., 0.00445 mole) is dissolved in 75 ml. of glacial acetic acid and the solution is allowed to stand at room temperature with stirring for 30 minutes.

To the solution is added in portions 300 ml. of water and the mixture is stirred at 0°–10° C. for 20 minutes. The reaction mixture is filtered and the residue washed with water. After drying there is obtained 1.3 g. (92%) of 1-ethyl-1'-benzyl-α,α'-epoxyferrocene in the form of yellow plates, M.P. 103–106°.

Analysis.—Calcd. for $C_{19}H_{18}FeO$: C, 71.71; H, 5.71. Found: C, 71.73; H, 5.99.

Example 8.—bis(1-hydroxyisopropyl)ferrocene

To a Grignard reagent prepared from 3.7 g. (0.15 mole) of magnesium and 42.4 g. (0.30 mole) of methyl iodide in 250 ml. of ether is added a solution of 10 g. (0.037 mole) of 1,1'-diacetylferrocene in 200 ml. of benzene in 45 minutes. The mixture is refluxed for 1¾ hours and stirred at room temperature for 16 hours. The complex is decomposed by the addition of 50 ml. of saturated ammonium chloride. The organic layer is separated, washed with 50 ml. of brine, dried and concentrated to yield an oil which is chromatographed through silica gel (190 g., 3×52 cm.) using 1.6 liters of a solution of varying proportions of ether and n-hexane to yield 4.6 g. of a crude material which is rechromatographed through silica gel (80 g., 3×25 cm.) in the same manner to yield bis(1-hydroxyisopropyl)ferrocene as a yellow-orange semisolid.

Example 9.—1,1'-[(α,α'-Tetramethyl)dimethyleneepoxy]ferrocene

To 75 ml. of glacial acetic acid is added 2.1 g. (0.07 mole) of bis(1-hydroxyisopropyl)ferrocene, the mixture is stirred under nitrogen for 20 minutes at room temperature, at 60° for 10 minutes, and again at room temperature for 1 hour. The mixture is diluted with 350 ml. of brine, and extracted three times with 75 ml. portions of benzene. The combined extracts are washed with brine, dried and concentrated to yield an orange oil which is chromatographed through silica gel (50 g.) using 650 ml. of varying proportions of benzene and n-hexane to yield a yellow solid which is recrystallized from n-hexane, cooled in a Dry Ice/acetone bath to yield 1,1'-[α,α'-tetramethyl)dimethyleneepoxy]ferrocene in the form of a yellow powder, M.P. 120-121°.

Example 10.—1,1'-di(α-hydroxy-α-methylbenzyl)-ferrocene

To a solution of 60 ml. (0.12 mole) of phenyllithium in benzene-ether is added dropwise under nitrogen 10 g. (0.037 mole) of diacetylferrocene in 450 ml. of benzene. The reaction mixture is stirred at room temperature for 3 hours and then allowed to reflux for 30 minutes under nitrogen.

After cooling, 15 ml. of saturated ammonium chloride solution is added dropwise to the mixture and it is stirred for 15 minutes. The solvent is distilled under diminished pressure to yield 16 g. of a dark semisolid.

The dark residue is dissolved in 200 ml. of n-hexane benzene (3:1) and the solution cooled using Dry Ice bath to give the crude diol, M.P. 124-126°, yellow solids.

The filtrate is distilled under diminished pressure and the residue triturated using ethanol to give 1,1'-di(α-hydroxy-α-methylbenzyl)ferrocene, M.P. 140-142°, yellow plates.

*Analysis.*—Calcd. for $C_{26}H_{26}FeO_2$: Fe, 13.20. Found: Fe, 13.30.

Example 11.—1,1'-[(α,α'-dimethyl-α,α'-diphenyl)dimethyleneoxy]ferrocene

The procedure of Example 9 is repeated using 1,1'-di-(α-hydroxy-α-methylbenzyl)ferrocene as the diol. The compound 1,1'-[(α,α'-dimethyl-α,α'-diphenyl)dimethyleneoxy]ferrocene is obtained.

It will be apparent to those skilled in the art that the novel compounds of the present invention may exist in different stereochemical forms.

I claim:
1. A compound of the formula

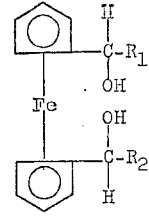

in which $R_1$ and $R_2$ are different members selected from methyl, ethyl, propyl, isopropyl, hexyl, phenyl and benzyl.
2. 1-(α-hydroxyethyl)-1'-(α'-hydroxypropyl)ferrocene.
3. 1-(α-hydroxyethyl)-1'-(α'-hydroxybenzyl)ferrocene.
4. 1-(α-hydroxyethyl)-1'-(α'-hydroxyhexyl)ferrocene.
5. 1-(α-hydroxymethyl)-1'-(α'-hydroxybenzyl)-ferrocene.
6. 1-(α-hydroxyethyl)-1'-(α'-hydroxymethyl)ferrocene.

References Cited

Winslow et al., J. Org. Chem. 26 (1961), p. 2982.
Pauson, J. Am. Chem. Soc. 76 (1954), pp. 2187-2191.
Schlögl et al., Monatsh. 93 (1962), pp. 1314-5 and 1324-5.
Nesmeyanov et al., Chem. Abst. vol. 5, col. 9599-9600, Abstract of Doklady Akad Nauk S.S.S.R. 111 (1956), pp. 605-8.

TOBIAS E. LEVOW, *Primary Examiner.*

A. P. DEMERS, *Assistant Examiner.*

U.S. Cl. X.R.

167—53, 68, 82, 83